US007317901B2

(12) United States Patent
Navsariwala et al.

(10) Patent No.: US 7,317,901 B2
(45) Date of Patent: Jan. 8, 2008

(54) SLOTTED MULTIPLE BAND ANTENNA

(75) Inventors: Umesh D. Navsariwala, Schaumburg, IL (US); Nicholas E. Buris, Deer Park, IL (US)

(73) Assignee: Motorola, Inc., Schaumburg, IL (US)

( * ) Notice: Subject to any disclaimer, the term of this patent is extended or adjusted under 35 U.S.C. 154(b) by 332 days.

(21) Appl. No.: 10/774,835

(22) Filed: Feb. 9, 2004

(65) Prior Publication Data

US 2005/0176390 A1 Aug. 11, 2005

(51) Int. Cl.
*H01Q 1/24* (2006.01)
*H04B 1/16* (2006.01)

(52) U.S. Cl. ........................ 455/82; 455/269; 455/273; 343/700 MS; 343/767

(58) Field of Classification Search ................ 455/269, 455/272, 273, 282, 288; 343/700 MS, 767–778
See application file for complete search history.

(56) References Cited

U.S. PATENT DOCUMENTS 6,133,880 A * 10/2000 Grangeat et al. ..... 343/700 MS
6,466,176 B1 * 10/2002 Maoz et al. ................ 343/767
6,670,923 B1 * 12/2003 Kadambi et al. .... 343/700 MS
6,680,705 B2 * 1/2004 Tan et al. .................... 343/702
6,741,214 B1 * 5/2004 Kadambi et al. .... 343/700 MS
6,762,723 B2 * 7/2004 Nallo et al. .......... 343/700 MS
6,831,607 B2 * 12/2004 Hebron et al. ....... 343/700 MS
6,856,294 B2 * 2/2005 Kadambi et al. ........... 343/702
6,975,834 B1 * 12/2005 Forster .................... 455/277.2
7,061,440 B2 * 6/2006 Choo et al. ................. 343/728
7,205,942 B2 * 4/2007 Wang et al. ......... 343/700 MS

OTHER PUBLICATIONS

U.S. Appl. No. 10/314,407, filed Dec. 7, 2002, Navsariwala et al.

* cited by examiner

*Primary Examiner*—Edward F. Urban
*Assistant Examiner*—Blane J. Jackson

(57) ABSTRACT

A multiple band antenna has an RF coupling structure (110) and a resonant RF structure (102). The RF coupling structure (110) has an RF connection (116, 118) and an RF coupling end (112, 114). The resonant RF structure (102) is reactively coupled to the RF coupling end (112, 114). The resonant RF structure (102) has a first end (106) and a second end (108) and has a conductive perimeter (102) enclosing at least one slot area (104) configured to induce an additional resonant RF band for the resonant RF structure (102). The first end (106) and the second end (108) are reactively coupled to a ground plane (124, 120) to facilitate longer wavelength operation. Cellular phones (800) and wireless communications sections incorporating such antennas are also provided.

16 Claims, 5 Drawing Sheets

800

SLOTTED MULTIPLE BAND ANTENNA

CROSS-REFERENCE TO RELATED APPLICATION

This application is related to prior U.S. patent application Ser. No. 10/314,407, filed on Dec. 7, 2002, entitled ANTENNA AND WIRELESS DEVICE UTILIZING THE ANTENNA, the entire disclosure of which is hereby incorporated by reference.

FIELD OF THE INVENTION

The present invention generally relates to the field of radio frequency antennas and more particularly to compact, multiple band antennas.

BACKGROUND OF THE INVENTION

Many wireless devices, such as cellular telephones, pagers, remote control devices, and the like, are required to operate in multiple RF bands. Examples of wireless devices that are required to operate in multiple RF bands include wireless devices that are to communicate via the 802.11b/g and 802.11a standards, which require communications in the 2.4 GHz band and the 5.2 and 5.8 GHz bands, respectively. Designers of wireless devices, particularly portable wireless devices such as cellular telephones, pagers, remote controllers, and the like, desire and even require antennas that operate in multiple RF bands and that also minimize physical size and fabrication cost. Several types of antennas are incorporated into wireless communications devices, including balanced antennas and unbalanced antennas.

A typical balanced antenna, such as a dipole or a loop, generally requires considerable size or volume within a wireless device. Such antennas can be integrated into the Printed Circuit Board (PCB) of the wireless device, but their size makes their use unattractive or even impractical.

Unbalanced antennas, such as an inverted-F antenna, are generally smaller than conventional balanced antenna structures. However, unbalanced antennas have a significant component of their radiating currents flowing through the ground plane of their wireless device, and are therefore sensitive to perturbations in the wireless device's ground plane. This effect is especially important for personal wireless devices, such as cell phones, that are sometimes, but not always, held in the hand of a user. A personal wireless device, such as a cell phone, has a much different ground plane characteristic when it is far from a person than when it is held in close proximity to a person, such as by a user. A further disadvantage in the use of unbalanced antennas is that many RF circuits used to drive antennas perform better with balanced interfaces to the antenna. An example of such better performance includes suppression of even order harmonics in power amplifiers that are driving a balanced load.

Therefore a need exists to develop an antenna that operates over multiple RF bands and that is particularly suitable for use with portable wireless devices.

SUMMARY OF THE INVENTION

According to a preferred embodiment of the present invention, a multiple band antenna has an RF coupling structure with an RF drive end and an RF coupling end. The multiple band antenna further has a resonant RF structure coupled to the RF coupling end. The resonant RF structure has a first end and a second end and also has a conductive perimeter enclosing at least one slot area. The conductive perimeter and the at least one slot area are configured to induce an additional resonant RF band for the resonant RF structure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting but rather to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

Figure 1:
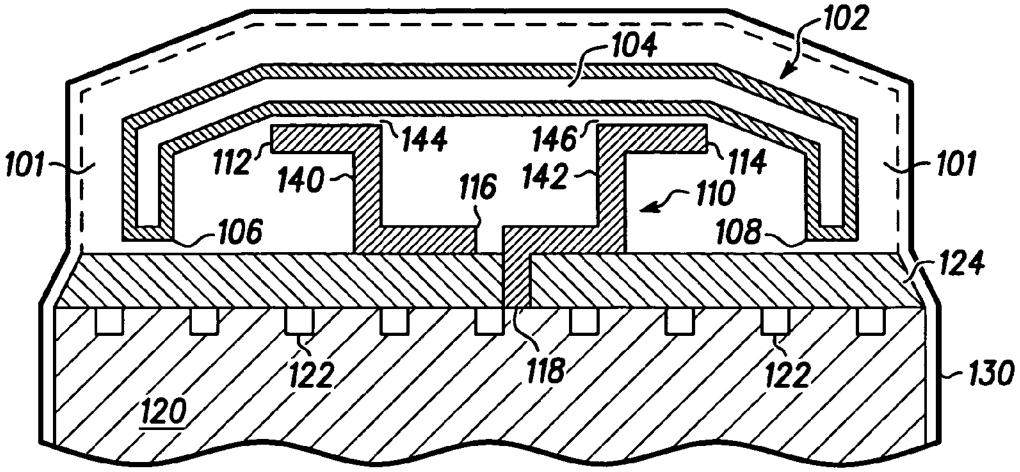
FIG. 1 illustrates a multiple band inverted-C antenna with a slot, according to an exemplary embodiment of the present invention.

A view of an exemplary antenna 100, comprising a multiple band inverted-C antenna with a slot, according to an exemplary embodiment of the present invention, is illustrated in FIG. 1. The exemplary multiple band inverted-C antenna with slot 100 is shown as constructed on a two-sided printed circuit board 101. The dielectric substrate of this two-sided printed circuit board 101 is not shown in the following diagrams in order to improve the clarity and understandability of the diagrams. The exemplary multiple band inverted-C antenna with slot 100 shows conductive areas of the two-sided printed circuit board 101 that form the antenna structure. The exemplary multiple band inverted-C antenna with slot 100 shows a back-side ground plane area 124. The back-side ground plane area 124 is the only conductive surface that is shown for the back, or reverse, side of the two-sided printed circuit board 101. The remainder of the conductive surfaces illustrated for the exemplary multiple band inverted-C antenna with slot 100 in this diagram are on the front side of this two-sided printed circuit board 101. Printed circuit board 101 in this embodiment is housed in a substantially non-conductive case 130.

The exemplary multiple band inverted-C antenna with slot 100 includes a front-side ground plane 120. The front side ground plane 120 and back-side ground plane 124 are relatively large areas of conductors placed on the dielectric substrate of the two-sided printed circuit board 101. The ground planes provide a conductive ground plane structure to support the desired operation of the exemplary multiple band inverted-C antenna with slot 100. The front-side ground plane 120 and back-side ground plane 124 are connected by a number of through-hole vias 122 that pass through the two sided printed circuit board dielectric substrate and provide an effective electrical connection between these two conductive sheets. It is to be understood that further embodiments of the present invention are able to incorporate ground plane structures that are on only one layer of a printed circuit board, or that are on some or all layers of a multiple layer printed circuit board.

The exemplary multiple band inverted-C antenna with slot 100 includes a resonant RF structure 102 that is formed with a conductive outer perimeter. The resonant RF structure 102 of this exemplary embodiment has a first end 106 and a second end 108 that are formed in proximity to the top edge of the back-side ground plane 124 and the front-side ground plane 120. The proximity of the first end 106 and the second end 108 to these ground planes allows reactive coupling between the resonant RF structure 102, through the first end 106 and the second end 108, and the ground planes. This reactive coupling supports resonance in the resonant RF structure 102 at wavelengths that are greater than would be supported by an isolated structure with the physical size of the resonant RF structure 102. The operation of the resonant RF structure 102, with its first end 106 and its second end 108 reactively coupled to nearby ground planes, advantageously allows a physically smaller antenna to be used with greater efficiency for longer wavelength operations. The resonant frequency, particularly in a lower frequency band, is varied by varying the placement of the ends 106 and 108 of the RF resonant structure 102 in relation to the ground plane 120 and 124.

The exemplary multiple band inverted-C antenna with slot 100 further includes an RF coupling structure 110 that includes a first feed conductor 140 and a second feed conductor 142. The first feed conductor 140 has an RF drive connection 116 at one end and a first RF coupling arm 112 at its opposite end. The second feed conductor 142 has a ground plane connection 118 at one end and a second RF coupling arm 114 at its opposite end. The RF drive connection 116 and the ground plane connection 118 form an unbalanced RF drive connection (i.e., a first RF coupling end) for the exemplary multiple band inverted-C antenna with slot of this exemplary embodiment. The RF drive connection 116 and the ground plane connection can alternatively be connected as balanced terminals for a balanced RF signal. The first RF coupling arm 112 and the second RF coupling arm 114 form an RF coupling end (i.e., a second RF coupling end) for the RF coupling structure 110. The first feed conductor 140 and the second feed conductor 142 transform the RF drive to a substantially symmetrical RF coupling that couples to the resonant radiating structure 102. This advantageously allows balanced or unbalanced driving of the resonant RF structure 102 in this exemplary embodiment. Further embodiments of the present invention operate with asymmetrical RF couplings or conductive electrical connections from the RF drive to a resonant RF structure.

The resonant RF structure 102 of this exemplary embodiment is reactively coupled to the RF coupling end of the RF coupling structure 110. The first RF coupling arm 112 in the exemplary embodiment is capacitively coupled to the resonant RF structure 102 through a first drive gap 144. The second RF coupling arm 114 is similarly capacitively coupled to the resonant RF structure 102 through a second drive gap 146. The capacitive coupling of the RF coupling structure 110 to the resonant RF structure 102 advantageously allows control of the RF circuit impedance exhibited by the exemplary multiple band inverted-C antenna with slot 100 and reduces fluctuations in this interface impedance. The resonant impedance of the exemplary multiple band inverted-C antenna with slot 100 is able to be varied by varying the width and/or length of the first drive gap 144 and the second drive gap 146. The width of these gaps is varied by placement of the first RF coupling arm 112 and the second RF coupling arm 114. The length of these gaps is adjusted by varying the length of these RF coupling arms. Further embodiments of the present invention include direct coupling of the resonant RF structure to the RF interface, as is described below.

It is to be noted that this exemplary embodiment of the present invention uses a substantially symmetrical layout for the antenna components. In an example of further embodiments, the different parts, such as the first RF coupling arm 112, the second RF coupling arm 114, the RF drive end 116, the ground plane connection 118, the first feed conductor 140 and the second feed conductor 142 of the RF coupling structure 110 can be on planes that are different from the RF resonant structure 102 and ground planes 120 and 124. In yet another embodiment, the parts of RF coupling structure, i.e., the first RF coupling arm 112, the second RF coupling arm 116, and the first feed conductor 140 can be on a plane that is different from the one or more planes containing the second RF coupling arm 114, the ground plane connection 118 and the second feed conductor 142 of the RF coupling structure 110. The design of such variation of the RF coupling structure 110 is able to be implemented by ordinary practitioners in the relevant arts by using, for example, antenna design tools including computer simulation of electromagnetic structures at RF frequencies.

The conductive perimeter of the resonant RF structure 102 of this exemplary embodiment encloses a slot 104. The presence of slot 104 in the resonant RF structure 102 has been observed to induce additional resonant frequencies for the exemplary multiple band inverted-C antenna with slot 100. This results in the exemplary multiple band inverted-C antenna with slot 100 exhibiting useable radiation patterns in multiple RF bands. The frequency characteristics of these multiple bands is affected by the dimensions of the slot 104. The above described structure, which includes having the first end 106 and the second end 108 reactively couple to the ground planes, further advantageously results in a balanced, multiple band antenna structure with compact dimensions relative to the longer wavelengths at which the antenna structure efficiently radiates.

Figure 2:
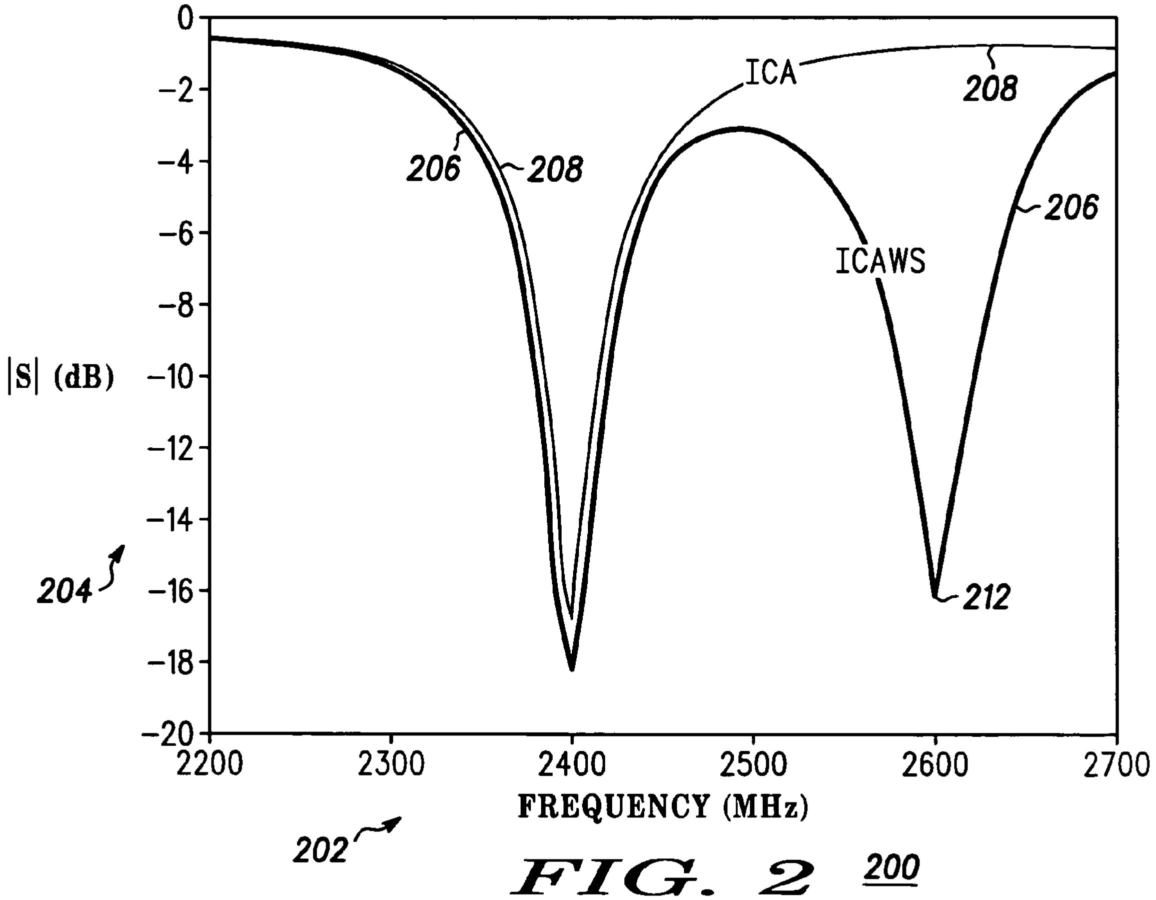
FIG. 2 is a lower band reflected input power graph, as determined by simulation for a multiple band inverted-C antenna with and without a slot, according to an exemplary embodiment of the present invention as illustrated in FIG. 1.

Computer simulation results for the above described exemplary multiple band inverted-C antenna with slot 100 indicate the characteristics of this antenna structure over multiple bands. FIG. 2 shows a lower band frequency response 200 for the exemplary multiple band inverted-C antenna with slot 100, as generated by a computer simulation. The lower band frequency response 200 illustrates the reflected power relative to input power characteristics for the RF input into two antennas, an un-slotted Inverted-C Antenna (ICA) and an Inverted-C Antenna With Slot (ICAWS), between the RF frequencies of 2200 MHz and 2700 MHz. The magnitude of the reflected power, relative to the input power, is illustrated on the vertical scale 204 as the decibel value of the magnitude $S_{11}$. The frequency for a particular point on this graph is shown on the horizontal scale 202, which linearly extends from 2200 MHz to 2700 MHz.

Two frequency response curves are illustrated in the lower band frequency response 200. A first curve is an un-slotted Inverted-C Antenna (ICA) curve 208 and a second curve is an Inverted-C Antenna With Slot (ICAWS) curve 206. The ICA curve 208 is provided as a reference to allow comparison with the ICAWS curve 206 so as to better illustrate the effect of the slot 104 in the exemplary multiple band inverted-C antenna with slot 100.

Both the ICA curve 208 and the ICAWS curve 206 demonstrate a first local minimum of reflected input power 210 in the vicinity of 2400 MHz. The reduced reflected input power in the vicinity of this RF frequency indicates that the remainder of the power delivered to the antenna is being radiated. The ICA curve 208 indicates that above 2400 MHz, the reflected input power increases, indicating that less power is radiated. In contrast, the ICAWS curve 206 exhibits a second reflected power local minimum 212 in the vicinity of 2600 MHz. This indicates improved radiation efficiency for the exemplary multiple band inverted-C antenna with slot 100 in the vicinity of 2600 MHz as compared to an un-slotted inverted-C antenna with similar dimensions. As is understood in the relevant arts, the receive and transmit characteristics of RF antennas are essentially identical. It is therefore understood that references to or descriptions of either one of the receive or the transmit characteristics of an antenna apply to both the receive and transmit characteristics of that antenna.

Figure 3:
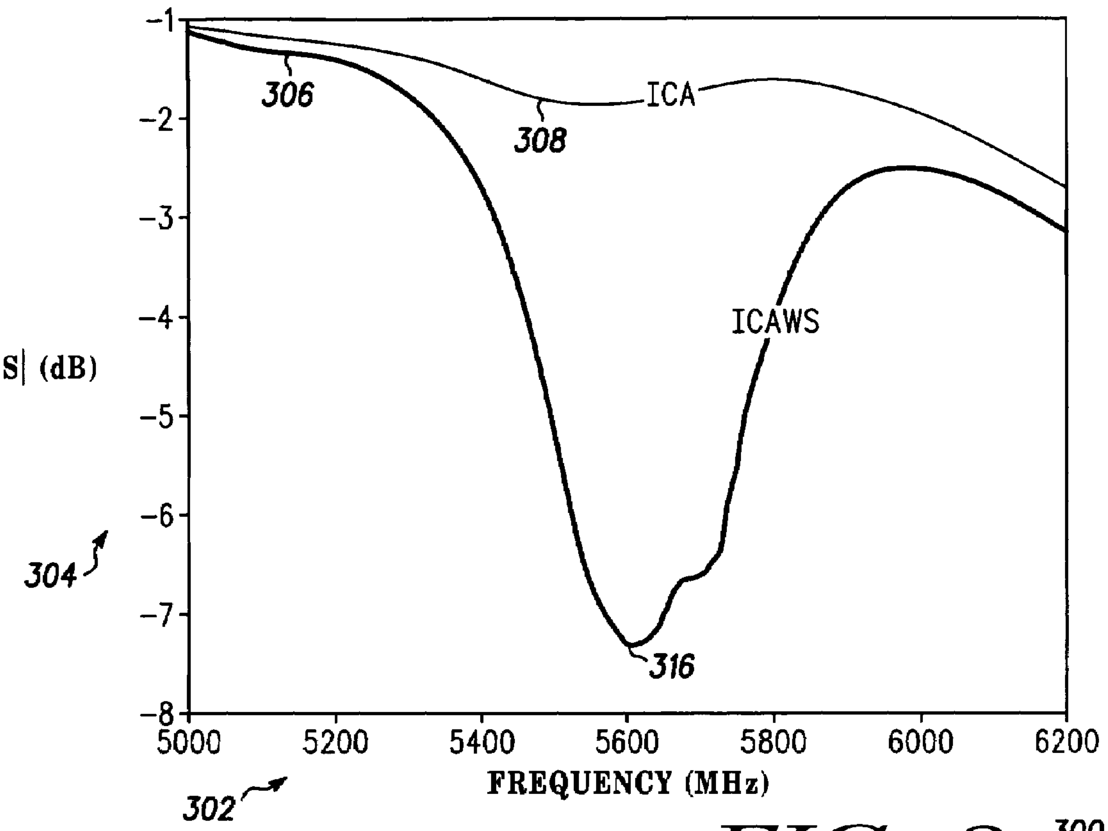
FIG. 3 is an upper band reflected input power graph, as determined by simulation for a multiple band inverted-C antenna with and without a slot, according to an alternative exemplary embodiment of the present invention as illustrated in FIG. 1.

FIG. 3 illustrates an upper band frequency response 300 for the exemplary multiple band inverted-C antenna with slot 100, as generated by a computer simulation. The upper band frequency response 300 illustrates the reflected power relative to input power for the input to the same two antennas discussed above, an un-slotted Inverted-C Antenna (ICA) and an Inverted-C Antenna With Slot (ICAWS), between the RF frequencies of 5000 MHz and 6200 MHz. The magnitude of the reflected power relative to the input power is illustrated on the vertical scale 304 as the decibel value of the magnitude $S_{11}$. The frequency for a particular point on this graph is shown on the horizontal scale 302, which linearly extends from 5000 MHz to 6200 MHz.

Two frequency response curves are also illustrated in the upper band frequency response 300. The first curve is a high band un-slotted Inverted-C Antenna (ICA) curve 308 and a second curve is a high band Inverted-C Antenna With Slot (ICAWS) curve 306.

The ICA curve 308 illustrates a high level of reflected input power across this RF band, indicating a poor radiation characteristic for this antenna in this band. In contrast, the high band ICAWS curve 306 exhibits a third reflected input power local minimum 316 in the vicinity of 5600 MHz. This indicates improved radiation efficiency for the exemplary multiple band inverted-C antenna with slot 100 in the vicinity of 5600 MHz, as compared to an un-slotted inverted-C antenna with similar dimensions. This demonstrates the advantageous performance of the exemplary multiple band inverted-C antenna with slot 100 that provides effective transmission and reception of RF signals in the multiple bands as illustrated.

Figure 4:
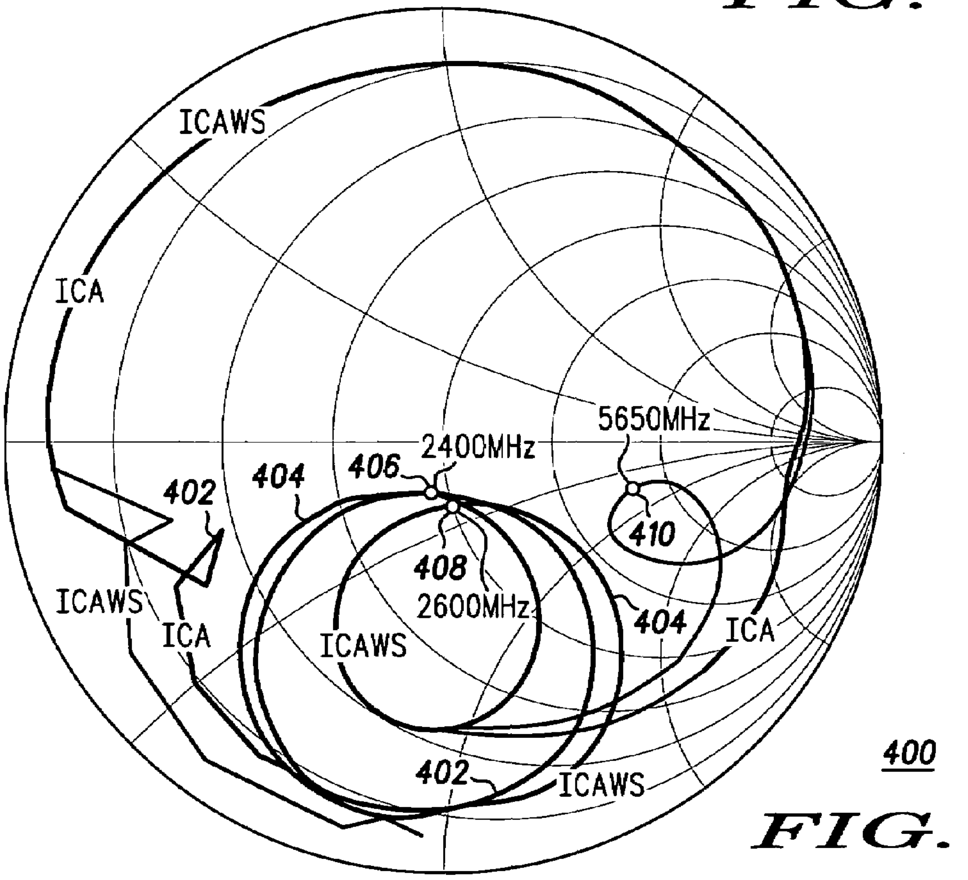
FIG. 4 illustrates a Smith chart showing reflected input power, as determined by simulation for a multiple band inverted-C antenna with and without a slot, according to the exemplary embodiment of the present invention as illustrated in FIG. 1.

FIG. 4 illustrates an Inverted-C Antenna and Inverted-C Antenna With Slot Smith chart diagram 400, as generated by a computer simulation. Two traces are shown on this Smith chart, an un-slotted ICA curve 402 and an ICAWS curve 404. The normalized $S_{11}$ values on the ICAWS curve for the points that correspond to the local minima that were illustrated in the above reflected power diagrams are particularly indicated on this chart. A first normalized $S_{11}$ value 406 is shown for an input RF frequency of 2400 MHz, a second normalized $S_{11}$ value 408 is shown for an input RF frequency of 2600 MHz and a third normalized $S_{11}$ value 410 is shown for an input RF frequency of 5650 MHz. These three normalized $S_{11}$ values are shown to have magnitudes closest to zero for these traces in their respective RF frequency bands, further illustrating the effectiveness of the exemplary multiple band inverted-C antenna with slot 100 within these multiple RF bands.

As illustrated above, the exemplary multiple band inverted-C antenna with slot 100 is able to effectively operate in the RF bands required by the 802.11b/g and 802.11a standards of 2.4 GHz and 5.2, 5.8 GHz, respectively. This multiple band operation is advantageously provided in these exemplary embodiments with a balanced antenna that has a compact size.

Figure 5:
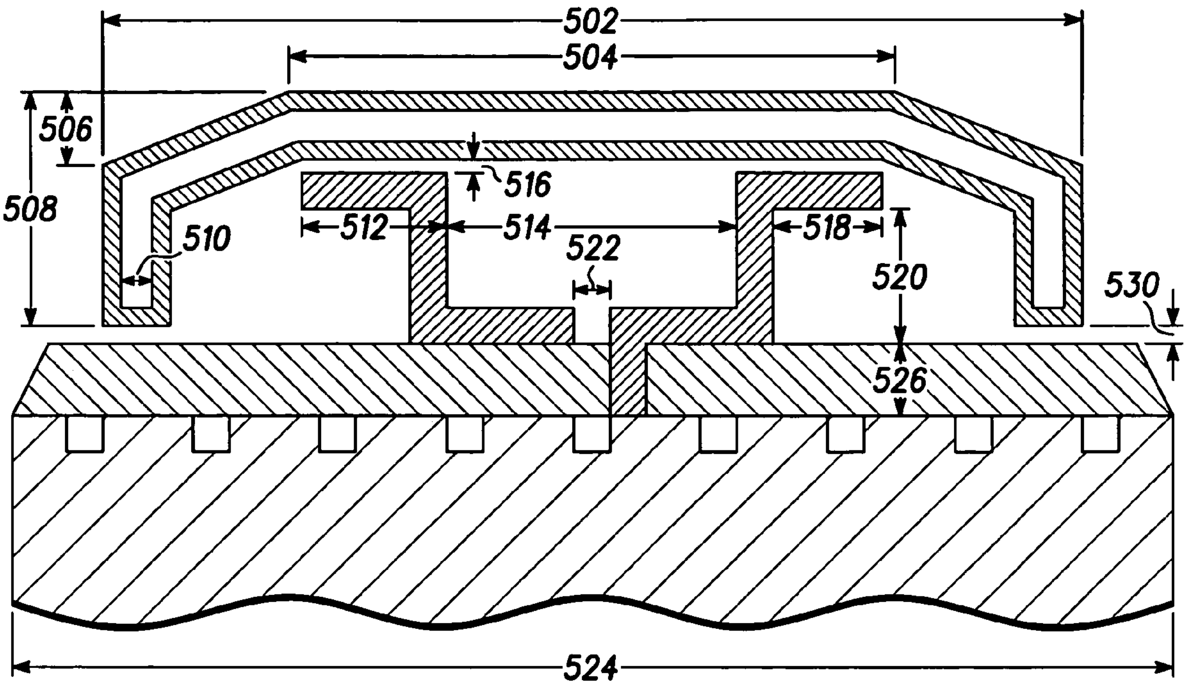
FIG. 5 illustrates the dimensions of a multiple band inverted-C antenna with a slot according to the exemplary embodiment of the present invention as illustrated in FIG. 1.

FIG. 5 illustrates the dimensions of the exemplary multiple band inverted-C antenna with slot 100 that corresponds to the structure used in the above described simulations. For this exemplary embodiment, an overall resonant RF structure width 502 is 27 mm, a resonant RF structure top length 504 is 16 mm, a resonant RF structure drop distance 506 that follows the contour of the PCB is 3.5 mm, and a resonant RF structure vertical arm height 508 is 7.0 mm, a slot width is 510 is 2.0 mm, an RF coupling end length 512 is 4.0 mm, an RF coupling end separation 514 is 8 mm, an RF coupling end to resonant RF structure gap 516 is 0.375 mm, an RF coupling end extension length 518, which is the difference between the RF coupling end length 512 and the width of the feed conductor 142, is 3 mm, an RF coupling end to bottom ground plane distance 520 is 3.75 mm, an RF drive gap 522 is 1 mm, a ground plane width 524 is 3.2 mm, a bottom ground plane extension 526, i.e., the distance that the bottom ground plane 124 extends past the top ground plane 120, is 2.0 mm, and a second end to bottom ground plane distance 530 is 0.5 mm. It is to be noted that RF antenna design techniques, particularly those that incorporate electro-magnetic simulation of antenna structures, can be advantageously used by ordinary practitioners in the relevant arts to adjust these dimensions in order to produce a similar multiple band inverted-C antenna with slot that operates with a variety of desired parameters. It is also to be understood that this exemplary embodiment of this multiple band inverted-C antenna with slot 100 is a substantially symmetrical structure so that the dimensions described above are shown for elements on one side of the exemplary multiple band inverted-C antenna with slot 100, the corresponding elements on the opposite side of the exemplary multiple band inverted-C antenna with slot 100 have the same dimension.

Figure 6:
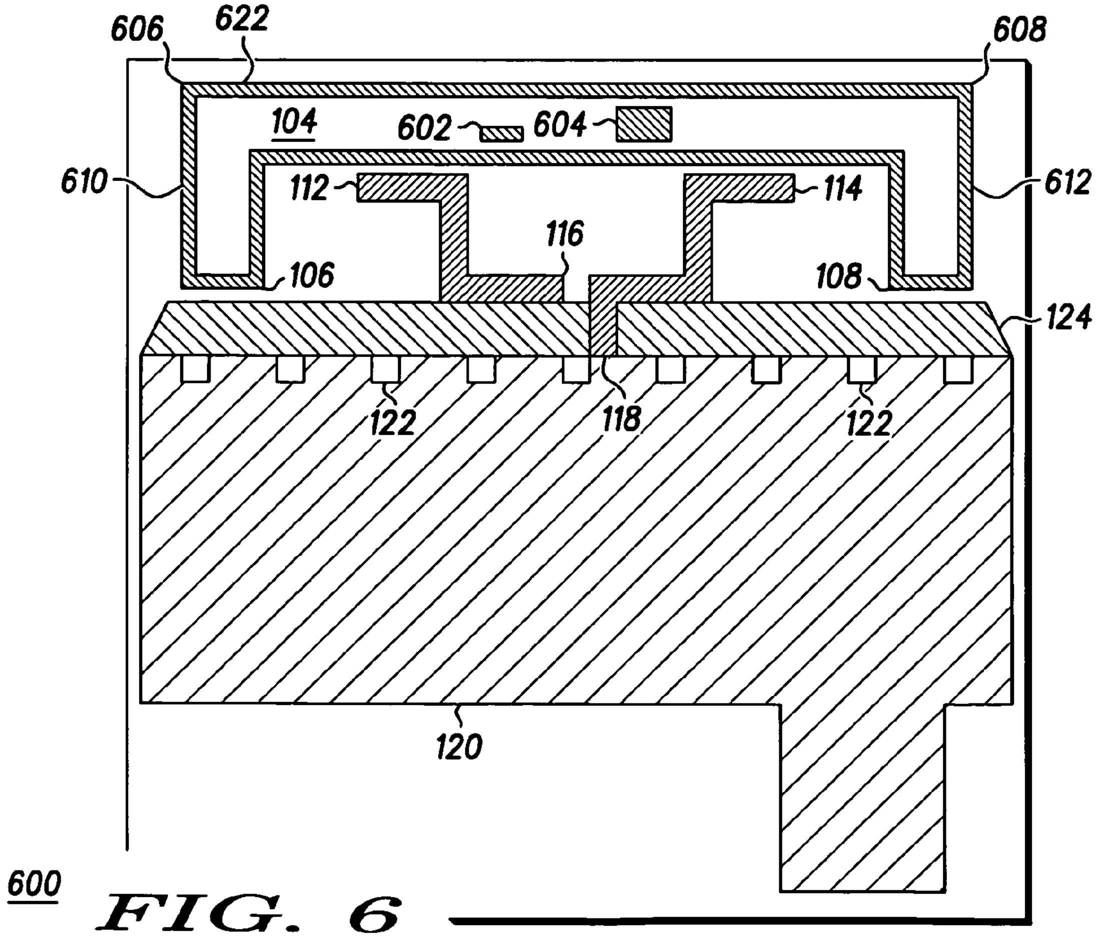
FIG. 6 illustrates an alternative multiple band inverted-C antenna with a slot and loading tabs, according to an alternative exemplary embodiment of the present invention.

FIG. 6 illustrates a slotted inverted-C antenna with loading tabs 600, according to another exemplary embodiment of the present invention. The slotted inverted-C antenna with loading tabs 600 shows a first loading tab 602 and a second loading tab 604, that are located within slot 104 of the alternate resonant RF structure 622. Adjustment of the various dimensions of the alternative resonant RF structure 622, including the size, number and position of loading tabs, are able to be modified in order to optimize the RF performance of the slotted inverted-C antenna with loading tabs 600 to satisfy various operating requirements and/or criteria. The design of a variation of the slotted inverted-C antenna with loading tabs 600 is able to be implemented by ordinary practitioners in the relevant arts by using, for example, antenna design tools including computer simulation of electromagnetic structures at RF frequencies. It is further clear that variations of the slotted inverted-C antenna with loading tabs 600 are able to include one or any number of loading tabs within the slot 104. It is further to be noted that these loading tabs can be conductively isolated from, i.e. without conductive or ohmic contact with, the conductive perimeter of the alternative resonant RF structure 622, as is shown in FIG. 6. Alternatively, or some or even all of the loading tabs within the slot 104 are able to be conductively connected to the conductive perimeter of the alternative resonant RF structure 622. The loading tabs induce a reactive component in the slot that allows the slot to resonate at a frequency that is lower than what is otherwise possible. They can therefore be employed to control the resonant frequency of the slot, particularly in a high band. Moreover, using tabs of different sizes and different connections to the conductive perimeter, multiple resonances can be created that can be controlled independently to tune the antenna to the required frequency bands, e.g., the 5.2 GHz and 5.8 GHz bands for the 802.11a protocols.

The alternative resonant RF structure 622 of the slotted inverted-C antenna with loading tabs 600 further illustrates an alternative design for that element. In contrast to the resonant RF structure 102 of the slotted inverted-C antenna 100, which has a drop 506, the alternative resonant RF structure 622 has a first vertical end 610 and a second vertical end 612 that form right angles with the top of the alternative resonant RF structure 622. This alternative design for the perimeter of the alternative resonant RF structure 622 is unrelated to the presence of loading tabs within the slot 104. Loading tabs are able be incorporated with equal effectiveness into any inverted-C antenna structure, including, without limitation, the exemplary inverted-C antenna 100 and the slotted inverted-C antenna with loading tabs 600. Resonant RF structures are able to incorporate such vertical ends, such as vertical ends that are substantially perpendicular to a central portion of the resonant RF structure, whether or not the resonant RF structure includes loading tabs.

Figure 7:
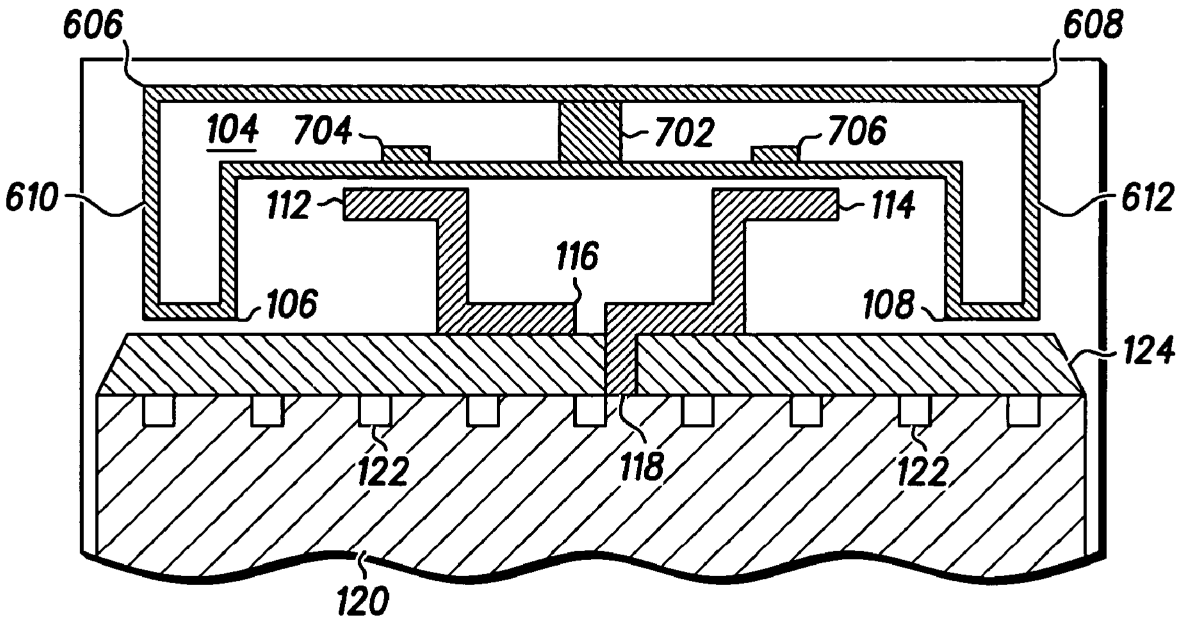
FIG. 7 illustrates a further alternative multiple band inverted-C antenna with a central loading tab, according to a further alternative exemplary embodiment of the present invention.

An exemplary slotted inverted-C antenna with central loading tab 700, according to another exemplary embodiment of the present invention, is illustrated in FIG. 7. The exemplary slotted inverted-C antenna with central loading tab 700 includes a central loading tab 702 that is conductively connected to two opposite sides of the conductive perimeter that forms the resonant RF structure 700 of the slotted inverted-C antenna with central loading tab 700. The slotted inverted-C antenna with central loading tab 700 of this exemplary embodiment has two additional loading tabs, a first additional loading tab 704 and a second additional loading tab 706. These additional loading tabs are in conductive or ohmic contact with one side of the conductive perimeter of the resonant RF structure 722, and are placed so as to enhance the operation of the slotted inverted-C antenna with central loading tab 700 in the bands of interest.

Figure 8:
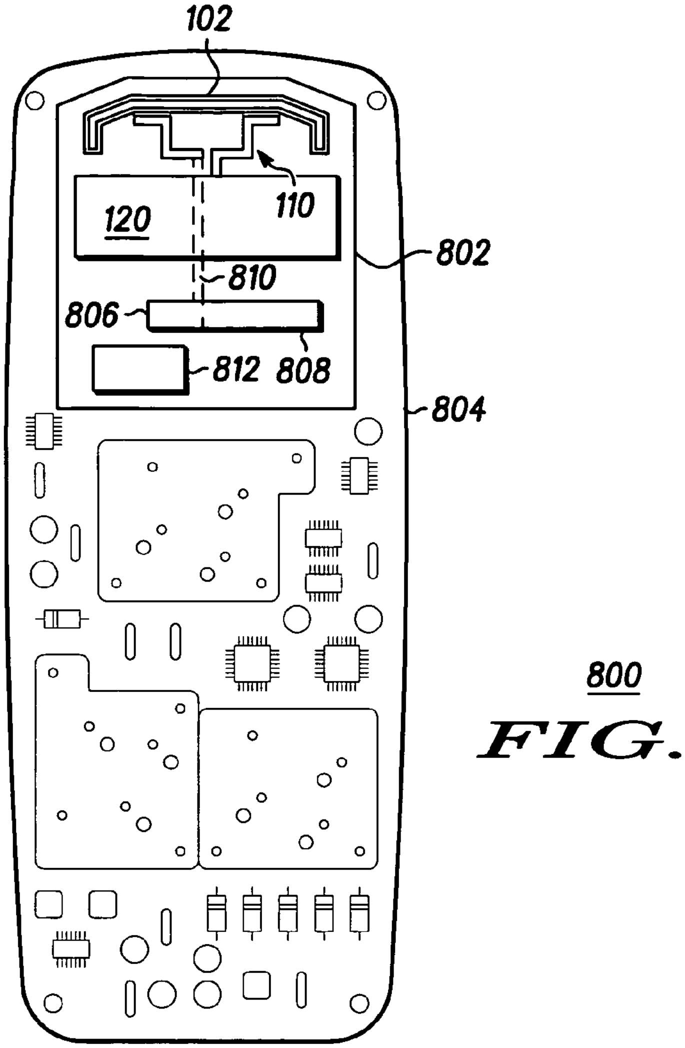
FIG. 8 illustrates a wireless device, such as a cellular telephone, incorporating a multiple band inverted-C antenna, according to an exemplary embodiment of the present invention.

An exemplary cellular telephone 800 incorporating a multiple band inverted-C antenna with slot is illustrated in FIG. 8. The exemplary cellular phone 800 includes a case 804 and a resonant RF structure 102 and RF coupling structure 110 that are similar to those of the exemplary inverted-C antenna with slot 100 described above. The front side ground plane 120 is also shown. A printed circuit board 802 is shown to be the mounting for the conductive elements of the antenna structure and other electronic components contained in the exemplary cellular phone 800. A back-side ground plane is also present but not shown.

The exemplary cellular phone 800 is shown to include an RF receiver 806 and an RF transmitter 808. The RF receiver 806 and RF transmitter 808 include an RF diplexing circuit (not shown) that allows simultaneous transmission and reception. The RF receiver 806 and RF transmitter 808 are connected to an RF feed line 810 that is routed on a lower layer of the multiple layer printed circuit board 802. The RF receiver 805, RF transmitter 808 the ground plane 120 and associated antenna structure form a wireless communications section in this exemplary embodiment. The exemplary cellular phone 800 further includes a baseband circuit 812 that processes data, audio, image and video data, as communicated with the user interface circuit, such as speakers, cameras and other interface circuits (all not shown), in a manner well known to those of ordinary skill in the art in order to interface this information with the RF receiver 806 and RF transmitter 808. Other circuits within the wireless device 800 are included, as is well known to ordinary practitioners in the relevant arts, but are not shown in order to enhance the clarity and understandability of this diagram.

In the exemplary cellular phone 800, a wireless device, and many other embodiments of the present invention, it is often desired to have an antenna structure, including the resonant RF structure 102, with a maximum size. The configuration illustrated for the exemplary cellular phone 800 shows the resonant RF structure 102 being located along the top edge of the case 804. This allows a maximum antenna area for a given case design. The shape of the resonant RF structure 102, according to various embodiments of the present invention, is able to be adjusted to conform to the shape of cases or other physical components housing the antenna structure. Design techniques known to practitioners of ordinary skill in the relevant arts, including utilization of computer simulation software to model the electromagnetic characteristics of antenna structures, are able to design such antenna structures to conform to a wide variety of case outlines and shapes.

Wireless devices, such as cell phones, are able to incorporate a number of multiple band antennas as described herein. Some multiple band antennas are able to be used for receive only operations, some are used for transmit only operations, and some are used for both transmit and receive operations. Such multiple band antenna arrangements as described herein can advantageously reduce the complexity of diplexing circuits. Multiple band antennas can be arranged within, or even outside of, a wireless device to provide spatial diversity for either wireless receive, wireless transmit, or both RF operations. These multiple band antennas are also able to be selectively coupled to receiver circuits and/or transmitter circuits to allow use of the antenna for receive and transmit functions, respectively. Selective coupling is able to include, for example, RF switching circuits that are selectively enabled to couple receiver circuits and/or transmitter circuits with at least one multiple band antenna, in accordance with alternative embodiments of the present invention.

The exemplary embodiments of the present invention advantageously provide a compact, multiple band antenna structure that is easily incorporated into portable wireless devices. These exemplary embodiments further provide a balanced radiator antenna structure that is less susceptible to ground plane variations, such as when a portable wireless device is being held by a user.

Figure 9:
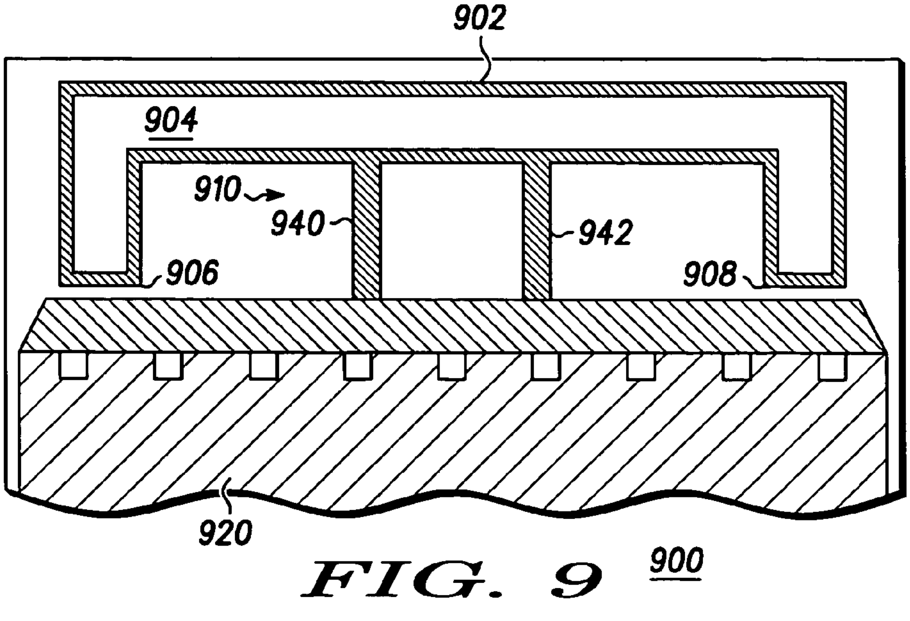
FIG. 9 illustrates a directly coupled multiple band inverted-C antenna with a slot, according to an exemplary embodiment of the present invention.

A directly coupled multiple band inverted-C antenna 900 according to an alternative embodiment of the present invention is illustrated in FIG. 9. The directly coupled multiple band inverted C antenna 900 includes a ground plane 900 and a directly coupled resonant RF structure 902 that encloses a slot 904. The directly coupled resonant RF structure 902 of this alternative embodiment is directly connected to an RF input by a direct coupling structure 910. A first coupling arm 940 and a second coupling arm 942 provide a connection from an RF drive input/output connection at the bottom of the illustrated direct coupling structure 910 to the directly coupled resonant RF structure 902. The direct coupling structure 910 is designed so as to induce resonance for the directly coupled multiple band inverted-C antenna 900 within one or more RF bands. Such designs will be readily accomplished by ordinary practitioners in the relevant arts in view of the present discussion.

The directly coupled resonant RF structure 902 further has a first end 906 and a second end 908. The first end 806 and the second end 908 of the directly coupled resonant RF structure 902 have a reactive coupling to the ground plane 920 to support resonance in the directly coupled resonant RF structure 902 at wavelengths that are greater than would be supported by an isolated structure with the physical size of the directly coupled resonant RF structure 902.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A multiple band antenna, comprising:

an RF coupling structure with an RF drive end and an RF coupling end; and a resonant RF structure reactively coupled to the RF coupling end, the resonant RF structure having a first end and a second end, the resonant RF structure comprising a conductive perimeter enclosing at least one slot area configured to induce an additional resonant RF band for the resonant RF structure, and wherein the resonant RF structure is isolated.

2. The multiple band antenna of claim 1, wherein the RF coupling end is substantially symmetrical.

3. The multiple band antenna of claim 1, wherein the RF coupling structure is on a plane that is different from the plane of the RF resonant structure, and further, the parts of the RF coupling structure are not on the same planes.

4. The multiple band antenna of claim 1, wherein the resonant RF structure is formed from conductors on a printed circuit board.

5. The multiple band antenna of claim 1, further comprising a reactive loading tab that substantially bisects one of the at least one slot area, the reactive loading tab conductively connected to the conductive perimeter at two physical points, the two points on opposite sides of the resonant RF structure.

6. The multiple band antenna of claim 1, further comprising at least one reactive loading tab that is located within one of the at least one slot area and positioned so as to enhance radiation in one of the additional RF band and a further additional RF band.

7. The multiple band antenna of claim 6, wherein the at least one reactive loading tab is conductively connected on at least one point to the conductive perimeter.

8. The multiple band antenna of claim 1, further comprising a ground plane reactively coupled to the first end and the second end of the resonant RF structure.

9. The multiple band antenna of claim 8, wherein the RF drive end comprises an interface comprising a first connection to an RF feed and a second connection to at least one of the ground plane or a second RF feed that is substantially out of phase with the first RF feed.

10. The multiple band antenna of claim 8, wherein the ground plane comprises a conductive area on a first layer of a circuit board and at least one additional conductive layer on another layer of the circuit board.

11. A wireless communications section, comprising:

at least one of a receiver for wirelessly receiving transmitted signals and a transmitter for wirelessly transmitting signals; and an antenna, communicatively coupled with the at least one of a receiver and a transmitter, the antenna comprising:

an RF coupling structure with an RF drive connection and an RF coupling end; and a resonant RF structure reactively coupled to the RF coupling end, the resonant RF structure having a first end and a second end, the resonant RF structure comprising a conductive perimeter enclosing at least one slot area configured to induce an additional resonant RF band for the resonant RF structure, and wherein the resonant RF structure is isolated.

12. A wireless device, comprising:

at least one of a receiver for wirelessly receiving transmitted signals and a transmitter for wirelessly transmitting signals;

a baseband processing portion, communicatively coupled to the at least one receiver and transmitter for processing at least one of data, voice, image and video signals in order to interface with at least one of the receiver and the transmitter; and at least one antenna, electrically coupled to the at least one receiver and transmitter, the at least one antenna comprising:

an RF coupling structure with an RF drive connection, electrically coupled to the at least one receiver and transmitter, and an RF coupling end; and a resonant RF structure reactively coupled to the RF coupling end, the resonant RF structure having a first end and a second end, the resonant RF structure comprising a conductive perimeter enclosing at least one slot area configured to induce an additional resonant RF band for the resonant RF structure, and wherein the resonant RF structure is isolated.

13. The wireless device according to claim 12, wherein the at least one antenna comprises at least one first antenna and at ieast one second antenna, the at least one first antenna being coupled with the receiver for wireless receiving and the at least one second antenna being coupled with the transmitter for wireless transmitting.

14. The wireless device according to claim 12, wherein the at least one antenna comprises at least one first antenna and at least one second antenna, the at least one first antenna and the at least one second antenna being arranged to provide spatial diversity.

15. A wireless communication circuit, comprising:

at least one of a receiver circuit for wirelessly receiving transmitted signals and a transmitter circuit for wirelessly transmitting signals; and an antenna, communicatively coupled with the at least one of a receiver circuit and a transmitter circuit, the antenna comprising:

an RF coupling structure with a first RF coupling end, communicatively coupled with the at least one of a receiver circuit and a transmitter circuit, and a second RF coupling end; and a resonant RF structure reactively coupled to the second RF coupling end, the resonant RF structure having a first end and a second end, the resonant RF structure comprising a conductive perimeter enclosing at least one slot area configured to induce an additional resonant RF band for the resonant RF structure, and wherein the resonant RF structure is isolated.

16. The wireless communication circuit of claim 15, wherein the first RF coupling end is selectively communicatively coupled with the at least one of a receiver circuit for receiving wireless transmitted signals and with the transmitter circuit for wirelessly transmitting signals.

* * * * *